(12) United States Patent
Mazzocco et al.

(10) Patent No.: US 10,220,668 B2
(45) Date of Patent: Mar. 5, 2019

(54) HVAC TEMPERATURE CONTROL BYPASS THROTTLE

(71) Applicants: DENSO International America, Inc., Southfield, MI (US); DENSO CORPORATION, Kariya-shi, Aichi-ken (JP)

(72) Inventors: Nicholas Mazzocco, Clawson, MI (US); Daniel Okray, St. Clair Shores, MI (US); Ryan Rosenburg, Royal Oak, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 1154 days.

(21) Appl. No.: 14/463,334

(22) Filed: Aug. 19, 2014

(65) Prior Publication Data
US 2015/0099452 A1    Apr. 9, 2015

Related U.S. Application Data

(60) Provisional application No. 61/888,111, filed on Oct. 8, 2013.

(51) Int. Cl.
*B60H 1/00*   (2006.01)

(52) U.S. Cl.
CPC ..... *B60H 1/00057* (2013.01); *B60H 1/00021* (2013.01); *B60H 1/00678* (2013.01);
(Continued)

(58) Field of Classification Search
USPC ........................ 454/108, 109, 145
See application file for complete search history.

(56) References Cited

U.S. PATENT DOCUMENTS 4,549,692 A * 10/1985 Busch ............... B60H 1/00064
    236/13
4,898,325 A *  2/1990 Sakurada ........... B60H 1/0005
    165/203
(Continued)

FOREIGN PATENT DOCUMENTS

DE        3826182 C1 * 10/1989 ......... B60H 1/00042
DE   502006007757-D1    10/2010
(Continued)

*Primary Examiner* — Gregory Huson
*Assistant Examiner* — Frances F Hamilton
(74) *Attorney, Agent, or Firm* — Harness, Dickey & Pierce, P.L.C.

(57) ABSTRACT

The present teachings provide for an HVAC assembly. A first flue can be configured to fluidly couple a first heat exchanger to a mixing flue. A second flue can be configured to fluidly couple a second heat exchanger to the mixing flue. A door can inhibit fluid communication through the second flue when in a first position. The door can inhibit fluid communication through the first flue when in a second position. The door can permit fluid communication through the first and second flues when in a third position. The third flue can be configured to fluidly couple the first heat exchanger to a portion of the second flue downstream of the second heat exchanger and upstream of the mixing flue when the door is in the third position.

3 Claims, 4 Drawing Sheets

(52) U.S. Cl.
CPC .............. *B60H 2001/00092* (2013.01); *B60H 2001/00707* (2013.01); *B60H 2001/00721* (2013.01)

(56) References Cited

U.S. PATENT DOCUMENTS

| | | | | |
|---|---|---|---|---|
| 5,106,018 | A * | 4/1992 | Loup | B60H 1/00678 165/204 |
| 5,195,574 | A | 3/1993 | Tanaka et al. | |
| 6,179,044 | B1 | 1/2001 | Tabara | |
| 6,439,296 | B1 | 8/2002 | Arold et al. | |
| 6,758,260 | B2 * | 7/2004 | Clifford | B60H 1/00678 165/103 |
| 7,527,091 | B2 * | 5/2009 | Ito | B60H 1/0005 165/140 |
| 8,480,462 | B2 * | 7/2013 | Tanaka | B60H 1/00678 454/143 |
| 9,476,520 | B2 * | 10/2016 | Haupt | B60H 1/00678 |
| 2005/0077038 | A1 * | 4/2005 | Perry | B60H 1/00678 165/202 |
| 2008/0200110 | A1 * | 8/2008 | Ghosh | B60H 1/00671 454/160 |
| 2009/0124187 | A1 * | 5/2009 | Sievers | B60H 1/00007 454/75 |
| 2010/0155015 | A1 * | 6/2010 | Hoehn | B60H 1/0005 165/42 |
| 2012/0253524 | A1 | 10/2012 | Norrell et al. | |
| 2015/0099452 | A1 * | 4/2015 | Mazzocco | B60H 1/00678 454/266 |
| 2015/0306935 | A1 * | 10/2015 | Shichiken | B60H 1/0005 165/47 |
| 2016/0039261 | A1 * | 2/2016 | Akahane | B60H 1/00528 165/203 |
| 2016/0152110 | A1 * | 6/2016 | Kim | B60H 1/0005 165/203 |
| 2016/0229266 | A1 * | 8/2016 | Maeda | B60H 1/0005 |

FOREIGN PATENT DOCUMENTS

| | | | | |
|---|---|---|---|---|
| EP | 1733904 | A1 | 12/2006 | |
| EP | 2050598 | A1 * | 4/2009 | ......... B60H 1/00678 |
| EP | 2774790 | B1 * | 12/2015 | ......... B60H 1/00678 |
| FR | 2547543 | A1 * | 12/1984 | ......... B60H 1/00042 |
| FR | 3035192 | A1 * | 10/2016 | ......... B60H 1/00064 |
| GB | 2479238 | B * | 12/2015 | ......... B60H 1/00592 |
| JP | 2008222024 | A | 9/2008 | |
| JP | 2017013704 | A * | 1/2017 | ......... B60H 1/00064 |
| KR | 20080041781 | A | 5/2008 | |

* cited by examiner

HVAC TEMPERATURE CONTROL BYPASS THROTTLE

CROSS-REFERENCE TO RELATED APPLICATIONS

This application claims the benefit of U.S. Provisional Application No. 61/888,111, filed on Oct. 8, 2013. The entire disclosure of the above application is incorporated herein by reference.

FIELD

The present disclosure relates to a heating, ventilation, and air conditioning ("HVAC") system having a temperature control bypass throttle.

BACKGROUND

This section provides background information related to the present disclosure which is not necessarily prior art.

Vehicles are known to include a heating, ventilation, and air conditioning ("HVAC") system to improve the comfort of the people within the passenger compartment of the vehicle. The HVAC system can heat and cool air blown through the HVAC system using a heating heat exchanger and/or a cooling heat exchanger. The heating heat exchanger, or heater core typically utilizes the engine coolant as a source of heat for heating the air. The cooling heat exchanger is typically an evaporator which is part of an air conditioning system in the vehicle.

Vehicle HVAC systems typically have internal passages and ducts for routing air through the system. The passages can route air to various components of the system, such as the evaporator, or the heat exchanger for example, before the air is directed into the ducts to be expelled into the passenger compartment.

Generally, HVAC systems can include doors, or gates within these passages that can be moved between opened and closed positions to selectively control airflow through the individual components, such as the heat exchanger for example. The position of these doors can be generally controlled by devices, such as servo motors, or linear actuators. When the door allows some air to pass through the heat exchanger and some air to bypass the heat exchanger, the hot and cold air generally must mix in a space downstream of the door before being directed into individual ducts. Smaller HVAC systems can be lighter and fit in more compact vehicles. However in compact HVAC systems, this mixing space can be relatively small, which can result in incomplete mixing of the hot and cold air. Adequate mixing of the hot and cold air can be important to passenger comfort levels by ensuring a uniform temperature of the air expelled to the passenger compartment. Accordingly, there exists a need for a device that more completely mixes the hot and cold air without increasing the size of the HVAC system.

SUMMARY

This section provides a general summary of the disclosure, and is not a comprehensive disclosure of its full scope or all of its features.

The present teachings provide for a vehicle heating, ventilation, and air conditioning ("HVAC") assembly including a mixing flue, a first flue, a second flue, a first door, and a third flue. The first flue can be configured to fluidly couple a first heat exchanger to the mixing flue. The second flue can be configured to fluidly couple a second heat exchanger to the mixing flue. The first door can be configured to move between a first, a second, and a third position. The first door can inhibit fluid communication through the second flue when the first door is in the first position. The first door can inhibit fluid communication through the first flue when the first door is in the second position. The first door can permit fluid communication through the first and second flues when the first door is in the third position. The third flue can be configured to fluidly couple the first heat exchanger to a portion of the second flue downstream of the second heat exchanger and upstream of the mixing flue when the first door is in the third position.

The present teachings further provide for a vehicle heating, ventilation, and air conditioning ("HVAC") assembly including a housing and a flue door mechanism. The housing can define a mixing cavity, a first flue, and a second flue. The first flue can be configured to fluidly couple a first heat exchanger to the mixing cavity. The second flue can be configured to fluidly couple a second heat exchanger to the mixing cavity. The flue door mechanism can include a pivot member and a first door. The pivot member can rotate about an axis between a first, a second, and a third rotational position. The pivot member can at least partially define a third flue that can be configured to fluidly couple the first heat exchanger to a portion of the second flue downstream of the second heat exchanger, when the pivot member is in the third rotational position. The first door can be coupled to the pivot member for common rotation with the pivot member. The first door can inhibit fluid communication through the second flue when the pivot member is in the first rotational position. The first door can inhibit fluid communication through the first flue when the pivot member is in the second rotational position. The first door can permit fluid communication through the first and second flues when the pivot member is in the third rotational position.

The present teachings further provide a vehicle heating, ventilation, and air conditioning ("HVAC") assembly including a heat exchanger, an evaporator, a housing and a flue door mechanism. The housing can define a mixing cavity, a first flue and a second flue. The first flue can be configured to direct a first flow of air received from the evaporator to the mixing cavity and bypassing the heat exchanger. The second flue can have an inlet and an outlet. The inlet can be configured to receive a second flow of air from the evaporator. The outlet can be configured to deliver the second flow of air to the mixing cavity. The second flue can be configured to direct the second flow of air through the heat exchanger. The flue door mechanism can include a pivot member and a first door. The pivot member can be configured to rotate about an axis between a first, a second, and a third rotational position. The pivot member can at least partially define a third flue that can be configured to receive a third flow of air from the evaporator and direct the third flow of air to a portion of the first flue when the pivot member is in the third rotational position. The portion of the first flue can be downstream of the heat exchanger and upstream of the mixing cavity. The first door can be coupled to the pivot member for common rotation with the pivot member. The first door can be configured to inhibit fluid communication between the evaporator and the second flue when the pivot member is in the first rotational position. The first door can be configured to inhibit fluid communication between the evaporator and the first flue when the pivot member is in the second rotational position. The first door can be configured to permit fluid communication between the evaporator and the first and second flues when the pivot member is in the third rotational position. The second door can be coupled to the pivot member for common rotation with the pivot member and can be configured to inhibit fluid communication between the second flue and the mixing cavity when the pivot member is in the first rotational position. The second door can be configured to permit fluid communication between the second flue and the mixing cavity when the pivot member is in the second and third rotational positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
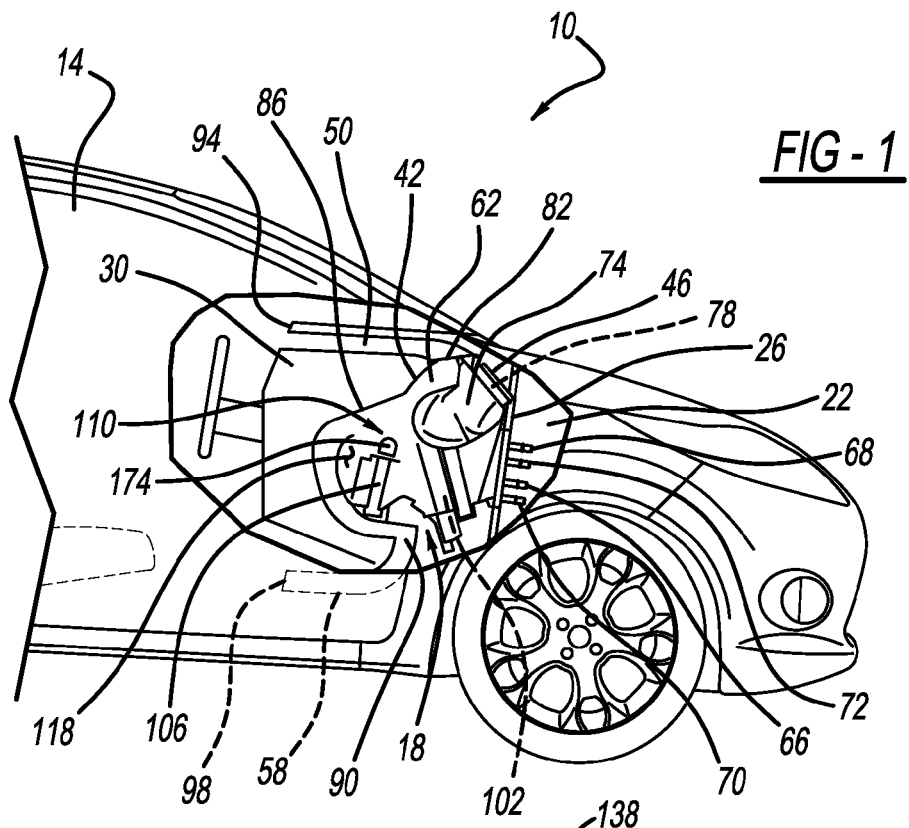
FIG. 1 is a side view of a vehicle having a heating, ventilation, and air conditioning ("HVAC") system in accordance with the present disclosure.

With reference to FIG. 1, a vehicle 10 is shown having a passenger compartment 14, a heating, ventilation, and air conditioning ("HVAC") system 18, an engine compartment 22, a firewall 26, and a dashboard, or instrument panel 30. The passenger compartment 14 is configured for vehicle occupants (not shown) to operate, ride in, or otherwise occupy the vehicle 10. The engine compartment 22 can generally include an engine (not shown), an engine coolant system (not shown), and a compressor (not shown). The engine coolant system can typically include a radiator and water pump configured to circulate a coolant fluid through a plurality of conduits in the engine to remove heat from the engine for example. The firewall 26 can generally separate the passenger compartment 14 and instrument panel 30 from the engine compartment 22. The instrument panel 30 can generally be between the passenger compartment 14 and the firewall 26. The instrument panel 30 can generally house a plurality of instruments (not shown), such as dials, displays, or controls for operating, viewing, or accessing navigation, entertainment, communications, or vehicle operational information for example. While the vehicle 10 in the example provided is shown as a car, it is understood that the HVAC system 18 can be used in other vehicles, such as a truck, or an agricultural, or military vehicle for example.

The HVAC system 18 can include an HVAC main unit 42, an intake duct 46, a first zone duct 50, a second zone duct 58, and any suitable number of additional ducts (not shown). The main unit 42 can be located within the vehicle 10, such as generally between the instrument panel 30 and the firewall 26. The main unit 42 can generally be configured to supply air to any one or more of the ducts 50 and 58. In the example provided, the first zone duct is configured to supply air to an upper portion of the passenger compartment 14 and the second zone duct 58 is configured to supply air to a lower portion of the passenger compartment 14, though other configurations can be used.

The main unit 42 can include a main housing 62, a refrigerant supply line 66, a heater supply line 68, a refrigerant return line 70, a heater return line 72, and a blower housing 74. The main housing 62 can define an intake port 78, a first air port 82, a second air port 90, and can also define additional air ports (not shown). The blower housing 74 can house a blower (not shown) configured to draw air from within the passenger compartment 14, and/or from outside the vehicle 10, through the intake duct 46 by way of the intake port 78, and blow the air through the main housing 62, as will be described below. The intake duct 46 can be configured to receive the air from the passenger compartment 14 and/or outside the vehicle 10. The refrigerant supply line 66 and refrigerant return line 70 can be fluid conduits that extend through the firewall 26 into the engine compartment 22. The refrigerant supply line 66 can supply refrigerant to the main unit 42, from the compressor (not shown). The refrigerant return line 70 can allow the refrigerant to return from the main unit 42, to the compressor. The main unit 42 will be described in greater detail below.

The first zone duct 50 can extend from the first air port 82, to the upper portion of the passenger compartment 14, and can be configured to supply air from the main unit 42 to the upper portion of the passenger compartment 14. The first zone duct 50 can be generally disposed within the instrument panel 30, or between the instrument panel 30 and the firewall 26, and can extend through the instrument panel 30 to expel air through one or more first vents 94 mounted in the instrument panel 30. While the example shows the first vents 94 located in the instrument panel 30, it is understood that the first vents 94 can alternatively, or additionally be located in other locations, such as in a pillar, a console, or a headliner of the vehicle 10 for example.

The second zone duct 58 can extend from the second air port 90, to the lower portion of the passenger compartment 14, and can be configured to supply air from the main unit 42 to the lower portion of the passenger compartment 14. The second zone duct 58 can extend from the second air port 90, to the lower portion of the passenger compartment 14 to expel air through one or more second vents 98 proximate to the lower portion of the passenger compartment 14.

Figure 2:
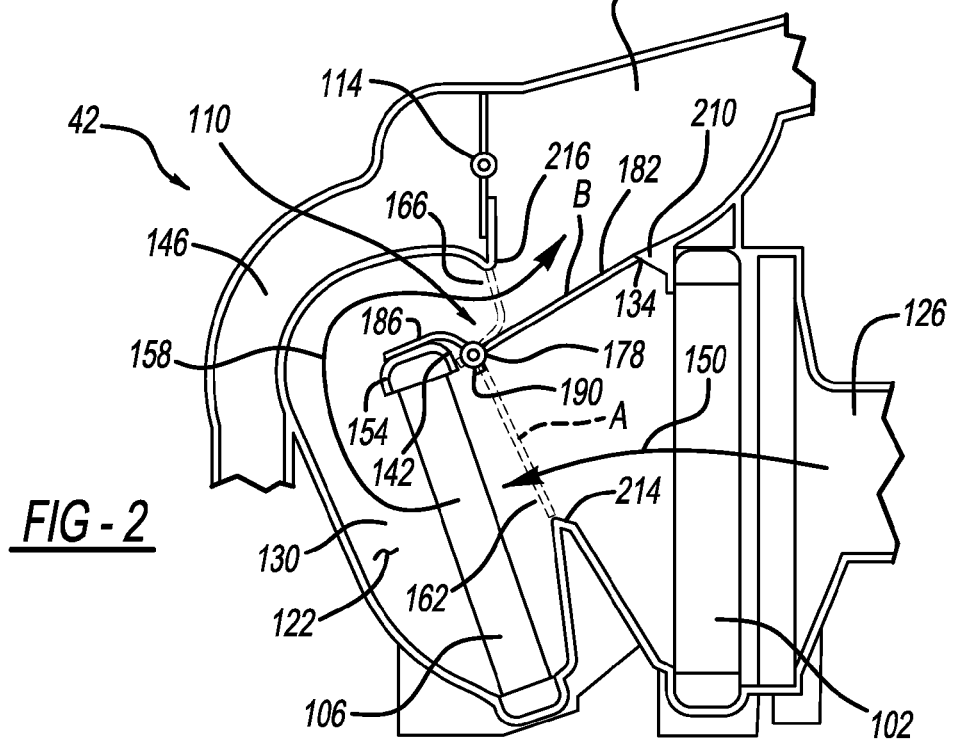
FIG. 2 is a sectional view of a portion of the HVAC system of FIG. 1 showing a flue door mechanism in a first and a second position.
Figure 3:
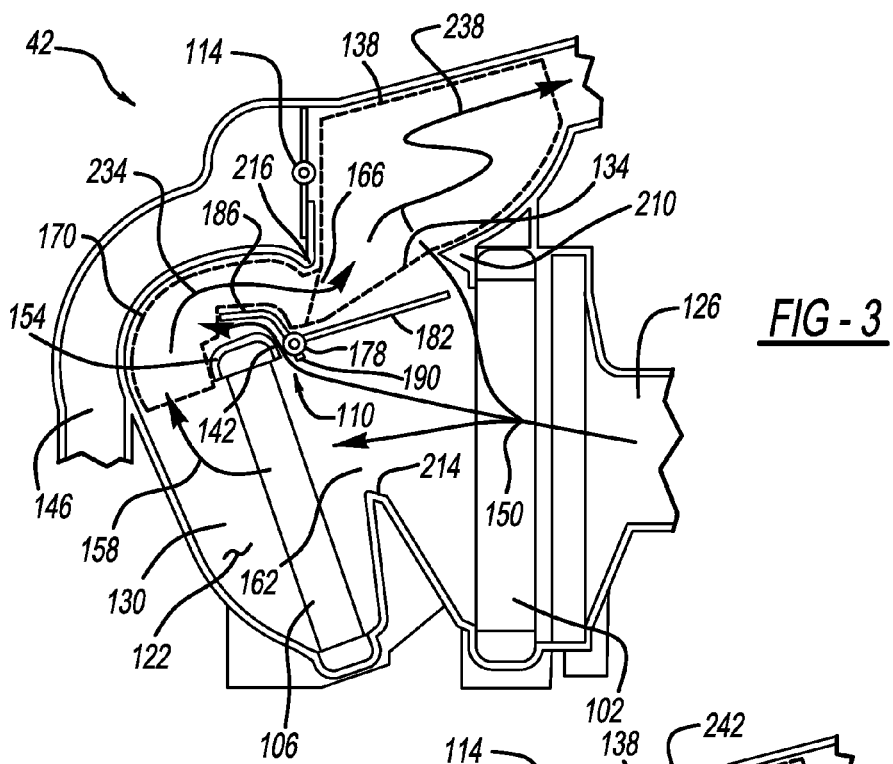
FIG. 3 is a sectional view of the portion of the HVAC system of FIG. 2 showing the flue door mechanism in a third position.
Figure 4:
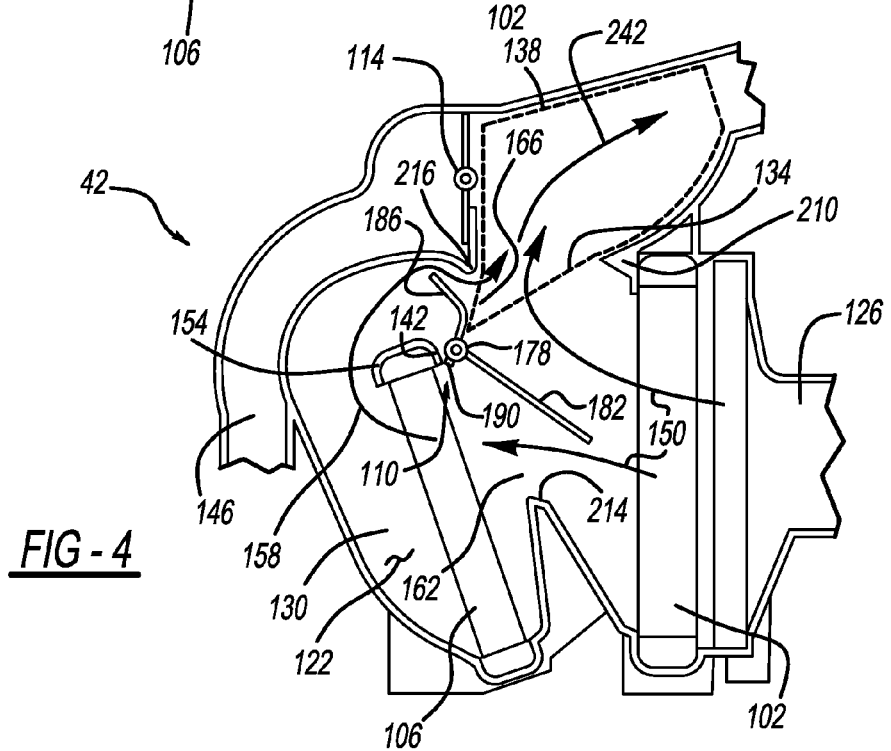
FIG. 4 is a sectional view of the portion of the HVAC system of FIG. 2 showing the flue door mechanism in a fourth position.

With additional reference to FIGS. 2-4, the main unit 42 is illustrated in greater detail. The main unit 42 can further include a cooling heat exchanger or evaporator 102, a heating heat exchanger or heater core 106, and a flue door mechanism 110. The main unit 42 can also include additional door mechanisms 114. The main housing 62 of the main unit 42 can include a first side 118 (FIG. 1), a second side 122, and a plurality of walls that can extend at least partially between the first and second sides 118, 122 to direct air through the main housing 62, to allow the mounting of elements within the main housing 62, such as the heat exchangers 102, 106 for example, or to provide structural support to the main housing 62. In the example provided, the main housing 62 at least partially defines an air supply flue 126, a hot air flue 130, a cool air flue 134, a mixing flue 138, and a bypass flue 142, each flue being configured to convey air through the main housing 62 along different, discrete pathways within the main housing 62. The main housing 62 can also define a lower flue 146.

The evaporator 102 can be any type of heat exchanger, such as a radiator for example. The evaporator 102 can be located within the main housing 62 and fluidly coupled with or disposed within the air supply flue 126. The evaporator 102 can be coupled to the refrigerant supply line 66 and the refrigerant return line 70 and can have a series of tubes (not shown), configured for the refrigerant fluid to pass through while flowing from the refrigerant supply line 66 to the refrigerant return line 70. The evaporator 102 can be configured such that air flowing through the air supply flue 126 can flow across the tubes. The refrigerant fluid can generally absorb heat from the air as the air passes across the tubes of the evaporator 102, to lower the temperature of the air and remove moisture from the air. The heated refrigerant fluid can then return to the compressor via the refrigerant return line 70. The cooled air, of a first temperature and illustrated as arrow 150, can then continue through the air supply flue 126, downstream of the evaporator 102, to proceed to either or both of the hot air flue 130 and the cool air flue 134. Under certain conditions that will be discussed below with reference to FIG. 3, some of the cooled air 150 can also pass through the bypass flue 142.

The heater core 106 can be any type of heat exchanger, such as a radiator for example. It is understood that the heater core 106 can alternatively, or additionally include an electrical heating element. The heater core 106 can be mounted within the main housing 62 and fluidly coupled with or disposed within the hot air flue 130. The heater core 106 can be supported or positioned within the main housing 62 by a support wall 154 extending around a first end of the heater core 106. The heater core 106 can be coupled to heater supply and return lines 68, 72, which can be configured to supply the heater core 106 with a heating fluid, such as engine coolant that has been heated by the engine for example. Similar to the refrigerant supply and return lines 66, 70, the heater supply and return lines 68 and 72 can pass through the firewall 26 and into the engine compartment 22, where the heating fluid is heated by the engine. The heating fluid can pass through a series of tubes (not shown) within the heater core 106, while flowing from the heater supply line to the heater return line. The heater core 106 is configured such that air flowing through the hot air flue 130 can flow across the tubes. The heating fluid can generally release heat to the air as it passes across the tubes of the heater core 106, to raise the temperature of the air. The hot air, of a second temperature that is higher than the first temperature, and illustrated as arrow 158, can then continue through the hot air flue 130 as will be discussed below.

The air supply flue 126 can be fluidly coupled with the blower housing 74 and intake port 78 to receive air therefrom. The hot air flue 130 can have an inlet 162 and an outlet 166. The inlet 162 can be proximate to the air supply flue 126, to receive air therefrom. The outlet 166 can be proximate to the mixing flue 138, such that air can flow from the hot air flue 130 to the mixing flue 138 through the outlet 166. The heater core 106 can be disposed within the hot air flue 130 between the inlet 162 and the outlet 166 such that air can pass through the heater core 106 as it flows from the inlet to the outlet 166. The cool air flue 134 can be proximate to the air supply flue 126 and the mixing flue 138, such that air can flow from the air supply flue 126, through the cool air flue 134, to the mixing flue 138 without flowing through the hot air flue 130 and without passing through the heater core 106. The lower flue 146 can be fluidly coupled to the mixing flue 138 and configured to receive air from the mixing flue 138. The lower flue 146 can be configured to direct air from the mixing flue 138 to the second air port 90.

The mixing flue 138 can be fluidly coupled to the first air port 82 and the lower flue 146 to provide air to the first and second zone ducts 50, 58. In this configuration, the additional mechanisms 114 can selectively provide air from the mixing flue 138 to one or more of the air ports 82, 90. The mixing flue 138 can be configured to allow air received from the cool air flue 134 and the hot air flue 130 to mix before the mixed air moves to any of the air ports 82, 90.

The bypass flue 142 can be proximate to the air supply flue 126 and a portion 170 of the hot air flue 130 that is downstream of the heater core 106 and upstream of the outlet 166. The bypass flue 142 and flue door mechanism 110 can be configured such that, when the flue door mechanism 110 is in certain rotational positions that will be discussed below, some of the cool air 150 can flow from the air supply flue 126, through the bypass flue 142, to the hot air flue 130 without flowing through the heater core 106 or the cool air flue 134.

Figure 5:
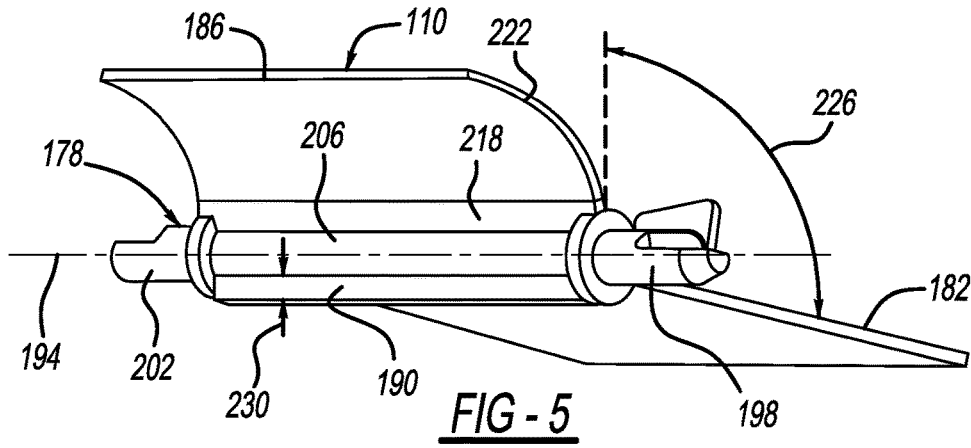
FIG. 5 is a perspective view of a portion of the flue door mechanism of FIG. 2.

With additional reference to FIG. 5, the flue door mechanism 110 can include an actuator 174 (FIG. 1), a pivot member 178, a first door 182, a second door 186, and a throttle member 190. In the example provided, the actuator 174 is a servo motor having an output shaft (not shown) coupled to the pivot member 178 for common rotation, though other actuator types can be used, such as a linear actuator with a rack and pinion or a mechanical control cable for example.

The pivot member 178 can be rotatably coupled to the main housing 62 and configured to rotate about an axis 194. The pivot member 178 can include a first end 198, a second end 202, and a central body 206. The first end 198 can be rotatably coupled to the first side 118 (FIG. 1) of the main housing 62 and the second end 202 can be rotatably coupled to the second side 122 of the main housing 62. In the example provided, the first end 198 is received in an orifice (not shown) formed in the first side 118 of the main housing 62 and the second end 202 is received in an orifice (not shown) formed in the second side 122 of the main housing 62, though other configurations can be used. The central body 206 can extend axially between the first and second ends 198, 202 to couple the first and second ends 198, 202 for common rotation within the main housing 62. In the example provided, the first end 198 is non-rotatably coupled to the output shaft of the actuator 174, though other configurations can be used to rotate the pivot member 178. In the example provided, the cool air flue 134 is defined by the first and second sides 118, 122, a first protruding wall 210 of the main housing 62, and the central body 206 of the pivot member 178, though other configurations can be used. In the example provided, the inlet 162 of the hot air flue 130 is defined by the first and second sides 118, 122, a second protruding wall 214 of the main housing 62, and the central body 206, though other configurations can be used. In the example provided, the outlet 166 of the hot air flue 130 is defined by the first and second sides 118, 122, a third protruding wall 216 of the main housing 62, and the central body 206, though other configurations can be used. In the example provided, the bypass flue 142 is defined by the first and second sides 118, 122, the support wall 154, and the central body 206, though other configurations can be used. While not specifically shown, it is understood that the support wall 154 can be a non-uniform shape in the axial direction between the first and second sides 118, 122 such that the amount and location of airflow through the bypass flue 142 can vary in the axial direction between the first and second sides 118, 122.

The first door 182 can be coupled to the pivot member 178 for common rotation therewith. In the example provided, the first door 182 and the pivot member 178 are unitarily formed of a thermoplastic material, though other configurations or materials can be used. The first door 182 can extend generally radially outward from the central body 206. In the example provided, the cool air flue 134 and inlet 162 of the hot air flue 130 form a generally rectangular shaped orifice, though any suitable shape can be used. In the example provided, the first door 182 has a generally rectangular profile, though the first door 182 can be any shape that can sufficiently close the inlet 162 of the hot air flue 130 when the pivot member 178 is in a first rotational position (shown in dashed lines and identified by reference letter A in FIG. 2) and sufficiently close the cool air flue 134 when the pivot member 178 is in a second rotational position (shown in solid lines and identified by reference letter B in FIG. 2).

The second door 186 can be coupled to the pivot member 178 for common rotation therewith. In the example provided, the second door 186 and the pivot member 178 are unitarily formed of a thermoplastic material, though other configurations or materials can be used. The second door 186 can extend generally radially outward from the central body 206. In the example provided, the outlet 166 of the hot air flue 130 forms a generally rectangular shaped orifice, though any suitable shape can be used. In the example provided, the second door 186 has a generally rectangular profile, though the second door 186 can be any shape that can sufficiently close the outlet 166 of the hot air flue 130 when the pivot member 178 is in the first rotational position (position A in FIG. 2). In the example provided, the second door 186 has a first portion 218 and a second portion 222, though other configurations can be used. The first portion extends radially outward from the pivot member 178 at an obtuse angle 226 relative to the first door 182. The second portion 222 extends from the first portion in an arcuate, or dog-leg manner to extend the second door 186 generally away from the first door 182. The second door 186 can be configured to contact the support wall 154 to close the bypass flue 142 when the pivot member 178 is in the second rotational position (position B in FIG. 2).

The throttle member 190 can be coupled to the pivot member 178 for common rotation therewith. In the example provided, the throttle member 190 and pivot member 178 are unitarily formed of a thermoplastic material, though other configurations or materials can be used. The throttle member 190 can extend generally radially outward from the central body 206, from a location along the circumference of the central body 206 between the first and second doors 182, 186 to permit airflow through the bypass flue 142 when the pivot member 178 is rotated to certain rotational positions that will be discussed below. The throttle member 190 can have a generally rectangular shaped profile having a width 230 that can be configured to block airflow through the bypass flue 142 when the pivot member 178 is in certain rotational positions, although other shapes can be used to control the amount and location of throttling of the bypass flue 142. In the example provided, the throttle member 190 extends the entire axial length of the central body 206, though other configurations can be used to direct airflow through the bypass flue 142 to different axial positions of the portion 170 of the hot air flue 130. For example, the throttle member 190 can extend a length less than the entire length of the central body 206 to allow airflow at certain axial locations along the central body 206 and not allow airflow at other axial locations along the central body 206. It is understood that the shape of the support wall 154 and the shape of the throttle member 190 can cooperate to control the location and amount of airflow through the bypass flue 142. It is also understood that some of the benefits of directing the airflow to specific axial locations, without all of the benefits of variable throttling through the bypass flue 142, can be achieved by varying the shape of the support wall 154 between the sides 118, 122, without respect to the existence or position of the throttle member 190. While specifically not shown, additional throttle members of different widths and/or located at different axial positions along the central body 206 can be used to vary the amount and/or location of airflow permitted through the bypass flue 142 at different rotational positions of the pivot member 178. For example, a second throttle member (not shown) can be coupled to the central body 206 for common rotation with the central body. The second throttle member can be generally parallel to the throttle member 190 or can similarly extend radially outward from the central body 206. While throttle member 190 is shown extending radially outward relative to the axis 194, it is understood that the throttle member 190 can extend from the central body 206 in directions not perfectly aligned with axis 194, such as perpendicular to the first door 182 for example.

In operation, when maximum cooling is desired in the passenger compartment 14, the actuator 174 can position the pivot member 178 in the first rotational position (position A in FIG. 2). In the first rotational position (position A in FIG. 2), the first door 182 can block the inlet 162 of the hot air flue 130 and the second door can block the outlet 166 of the hot air flue 130. In this position, the first door 182 can direct all of the cooler air 150 through the cool air flue 134 to the mixing flue 138, to be directed to the desired air ports 82, 90. When maximum heating is desired in the passenger compartment 14, the actuator 174 can position the pivot member 178 in the second rotational position (position B in FIG. 2). In the second rotational position (position B in FIG. 2), the first door 182 can block the cool air flue 134 and the second door 186 can block the bypass flue 142. In this position, the first door 182 can direct all of the cooler air 150 through the hot air flue 130 to be heated by the heater core 106 and delivered to the mixing flue 138 to be directed to the desired air ports 82, 90.

When more moderate temperatures are desired, the actuator 174 can position the pivot member 178 in rotational positions between the first and second rotational positions (positions A and B in FIG. 2) to permit some of the cool air 150 to be directed through the hot air flue 130 and some of the cool air 150 to be directed through the cool air flue 134. As the pivot member 178 is rotated from the second rotational position (position B in FIG. 2) toward the first rotational position (position A in FIG. 2), the pivot member 178 can reach a third rotational position (shown in FIG. 3)

that is between the first and second rotational positions (positions A and B in FIG. 2) and a fourth rotational position (shown in FIG. 4) that is between the first and third rotational positions (position A in FIG. 2 and FIG. 3). As the pivot member 178 is rotated further from the second rotational position (position B in FIG. 2), the first door 182 opens the cool air flue 134 further to allow an increasing amount of the cool air 150 to pass through the cool air flue 134, while closing the inlet 162 to inhibit an increasing amount of the cool air 150 from passing through the hot air flue 130. As the pivot member 178 is rotated further from the second rotational position (position B in FIG. 2), the second door 186 also closes the outlet 166 further to inhibit or throttle airflow through the outlet 166, while also preventing back-flow from the mixing flue 138 into the hot air flue 130.

In the third rotational position (FIG. 3), the second door 186 can be spaced apart from the support wall 154 to allow some of the cool air 150 to flow through the bypass flue 142 and into the portion 170 of the hot air flue 130. The arcuate or dog-leg shape of the second door 186 can direct the cool air 150 from the bypass flue 142 in an upstream direction relative to the hot air 158, to mix with the hot air 158 upstream of the outlet 166. In this way the hot air 158 of the second temperature can pre-mix with the cool air 150 of the first temperature that passes through the bypass flue 142. The pre-mixing of the cool and hot air 150, 158 of the first and second temperatures within the hot air flue 130 can result in a mass of air of a third temperature that is greater than the first temperature and less than the second temperature, and is illustrated as arrow 234. This air 234 of the third temperature can then pass through the outlet 166 to mix with the cool air 150 from the cool air flue 134 in the mixing flue 138. The mixing of the air masses 150, 234 of the first and third temperatures in the mixing flue 138 can result in a mass of air of a fourth temperature, illustrated as arrow 238, that is less than the third temperature and greater than the first temperature. The pre-mixing in the hot air flue 130 and subsequent mixing in the mixing flue 138, can allow for a more uniform air temperature to be received by the air ports 82, 90 by providing for a more gradual mixing process and for the mixing to occur across a longer distance without increasing the size of the main unit 42.

As the pivot member 178 is rotated from the third rotational position (FIG. 3) further toward the first rotational position (position A in FIG. 2), the pivot can reach the fourth rotational position. As the pivot member 178 rotates from the third rotational position (FIG. 3) toward the fourth rotational position (FIG. 4), the throttle member 190 can rotate into the bypass flue 142 to block a portion of the airflow through the bypass flue 142. As the pivot member 178 rotates further toward the fourth rotational position, the throttle member 190 can block or throttle an increasing amount of the airflow through the bypass flue 142 such that less pre-mixing can occur. In the fourth rotational position, the throttle member 190 can close the bypass flue 142 to inhibit air-flow through the bypass flue 142. In this position in the example provided, the hot air 158 and cool air 150 meet and mix in the mixing flue 138 without any pre-mixing to form a mass of air of a fifth temperature and illustrated as arrow 242. It is understood that negligible pre-mixing may occur if incomplete sealing occurs between the throttle member 190 and the support wall 154. It is also understood that some pre-mixing may occur with other configurations of the throttle member 190, such as when the throttle member 190 does not extend the entire axial length of the central body for example. In the example provided, as the pivot member 178 is rotated further from the fourth rotational position toward the first rotational position (position A in FIG. 2), the throttle member 190 continues to block air-flow through the bypass flue 142, though other configurations can be used.

Figure 6:
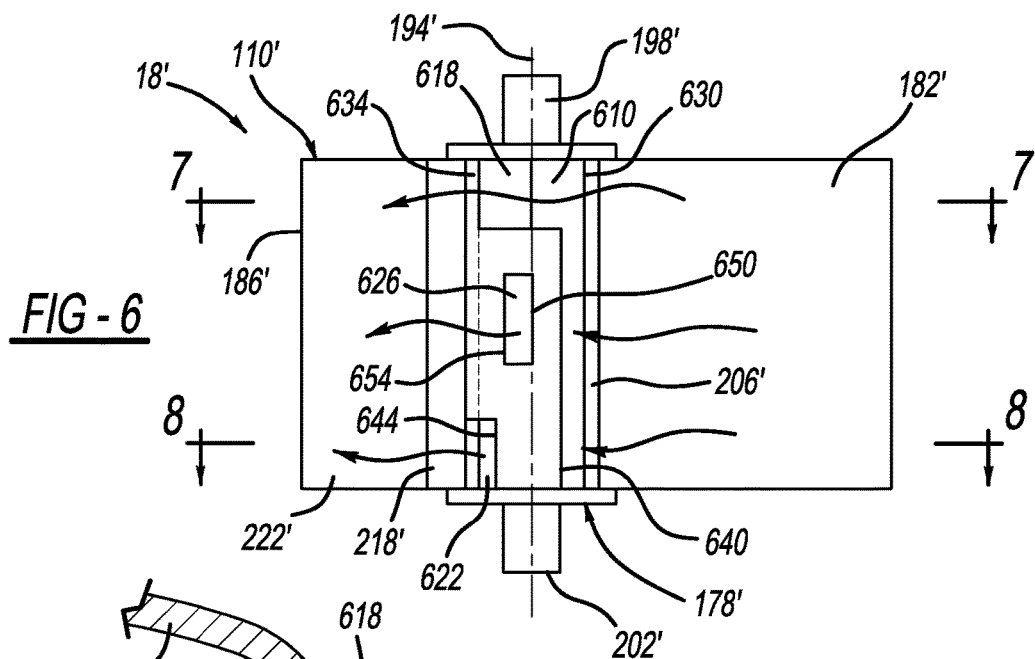
FIG. 6 is a side elevated view of a portion of a flue door mechanism for an HVAC system of a second construction and in accordance with the present disclosure.
Figure 7:
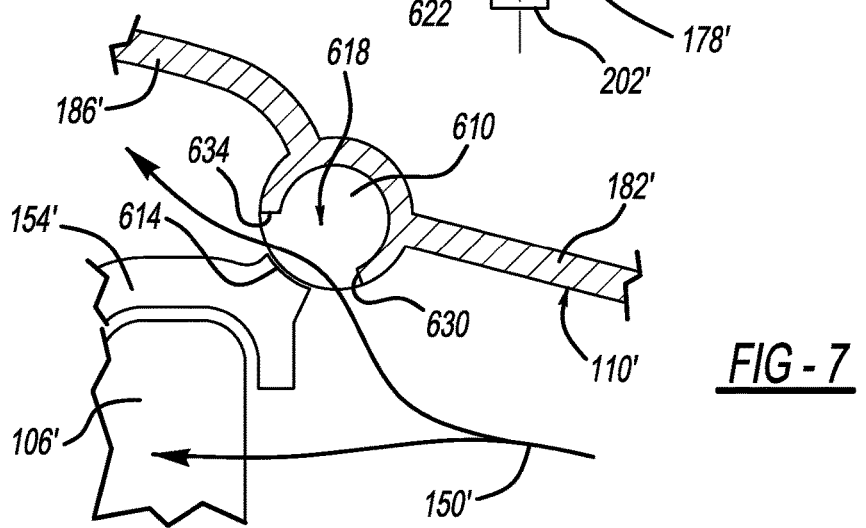
FIG. 7 is a sectional view of the portion of the flue door mechanism of FIG. 6, cut along line 6-6, and a portion of the HVAC system of the second construction.
Figure 8:
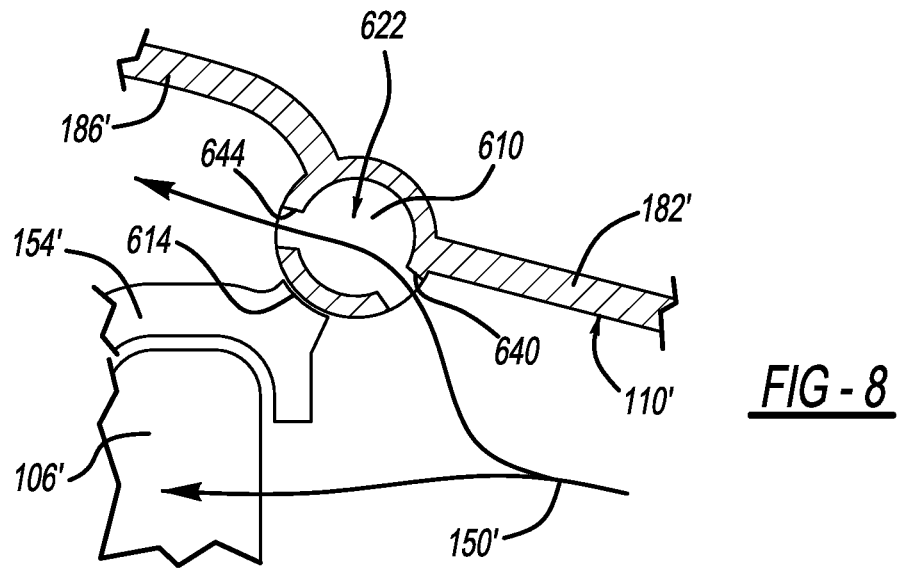
FIG. 8 is a sectional view of the portion of the flue door mechanism of FIG. 6, cut along line 8-8, and a portion of the HVAC system of the second construction.

With reference to FIGS. 6-8, a portion of an HVAC system of a second construction is illustrated and generally denoted by reference numeral 18'. The HVAC system 18' can be substantially similar to the HVAC system 18 and primed numerals denote similar components to non-primed numerals of HVAC system 18. Accordingly, only the differences will be described in detail, and the descriptions of the similar components of FIGS. 1-5 are incorporated by reference with respect to the similarly numbered components. A portion of the flue door mechanism 110' of the second construction is illustrated as having first and second doors 182', 186' that can be similar to the first and second doors 182, 186. In this construction, the throttle member 190 can be eliminated and its inhibiting or throttling function integrated into the central body 206' of the pivot member 178'.

In this construction, the central body 206' can define a central chamber 610 and one or more possible pathways that can selectively be closed by the main housing 62, such as by a surface 614 of the support wall 154', to selectively inhibit or allow air-flow from the air supply flue 126', through the central chamber 610, to the portion 170' of the hot air flue 130'. In the example provided, the central body 206' includes a first bypass path 618, a second bypass path 622, and a third bypass path 626. It is understood that any one of the bypass paths 618, 622, 626 can be moved axially along the central body 206' and/or used alone or in combination with any number of or axial or circumferential position of the other bypass paths 618, 622, 626 based on the desired amount and/or location of pre-mixing.

With specific reference to FIG. 7, the first bypass path 618 is shown. The first bypass path 618 can include a portion of the central chamber 610 that is generally open along a length of the circumference of the central body 206' between a first circumferential end 630 and a second circumferential end 634. The first circumferential end 630 can be proximate to the first door 182' and the second circumferential end 634 can be proximate to the second door 186'. When the pivot member 178' is in a first rotational position, similar to the first rotational position shown by dashed lines and identified as position A in FIG. 2, the first door 182' can close the inlet 162' of the hot air flue 130' and the second door 186' can close the outlet 166' of the hot air flue 130', similar to the flue door mechanism 110. When the pivot member 178' is in a second rotational position, similar to the second rotational position shown by solid lines and indicated by reference letter B in FIG. 2, the first door 182' can close the cool air flue 134' and the second door 186' can allow flow through the outlet 166'.

As the pivot member 178' is rotated from the second rotational position toward the first rotational position, the pivot member 178' can reach a third rotational position. Before reaching the third rotational position, the second circumferential end 634 can be aligned with the surface 614 of the support wall 154' to close the first bypass path 618 and inhibit flow from the central chamber 610 to the portion 170' of the hot air flue 130'. In the third rotational position, the first and second circumferential ends 630, 634 can be not aligned with the surface 614, such that the first bypass path 618 can be open to allow fluid communication from the air supply flue 126', through the central chamber 610, and to the portion 170' of the hot air flue 130'. The pivot member 178' can be further rotated to a fourth rotational position that is between the first and third rotational positions. In the fourth rotational position, the first circumferential end 630 can be aligned with the surface 614 to close the first bypass path 618 and inhibit flow from the air supply flue 126' to the central chamber 610.

With specific reference to FIG. 8, the second bypass path 622 is shown. The second bypass path 622 can have an inlet 640 and an outlet 644. While shown generally toward the second end 202' of the pivot member 178', the outlet 644 can be located in different locations along the axis 194' as desired. The second bypass path 622 can permit fluid communication from the air supply flue 126' through the central chamber 610, to the portion 170' of the hot air flue 130' when the inlet 640 and outlet 644 are not aligned with the surface 614. In the example provided, fluid communication through the second bypass path 622 can be permitted when the pivot member 178' is rotated to the third rotational position, while inhibited at the fourth rotational position. It is understood that the circumferential position of the inlet 640 and/or outlet 644 can determine the relative rotational positions at which the second bypass path 622 is open to permit fluid communication and that these relative positions can be different than the rotational positions where the first bypass path 618 is open.

The third bypass path 626 can have an inlet 650 and an outlet 654 similar to the second bypass path 622. While shown in a generally central axial location, the outlet 654 can be located in different locations along the axis 194' as desired. The third bypass path 626 can be substantially similar to the second bypass path 622, but the outlet 654 can be located at a different location along the circumference of the central body 206' to permit and inhibit fluid communication between the air supply flue 126' and the portion 170' of the hot air flue 130' at different rotational positions. In the example provided, fluid communication through the third bypass path 626 can be blocked by the surface 614 when fluid communication is permitted through the second bypass path 622, while fluid communication can be permitted through the third bypass path 626 when inhibited through the second bypass path 622.

Figure 9:
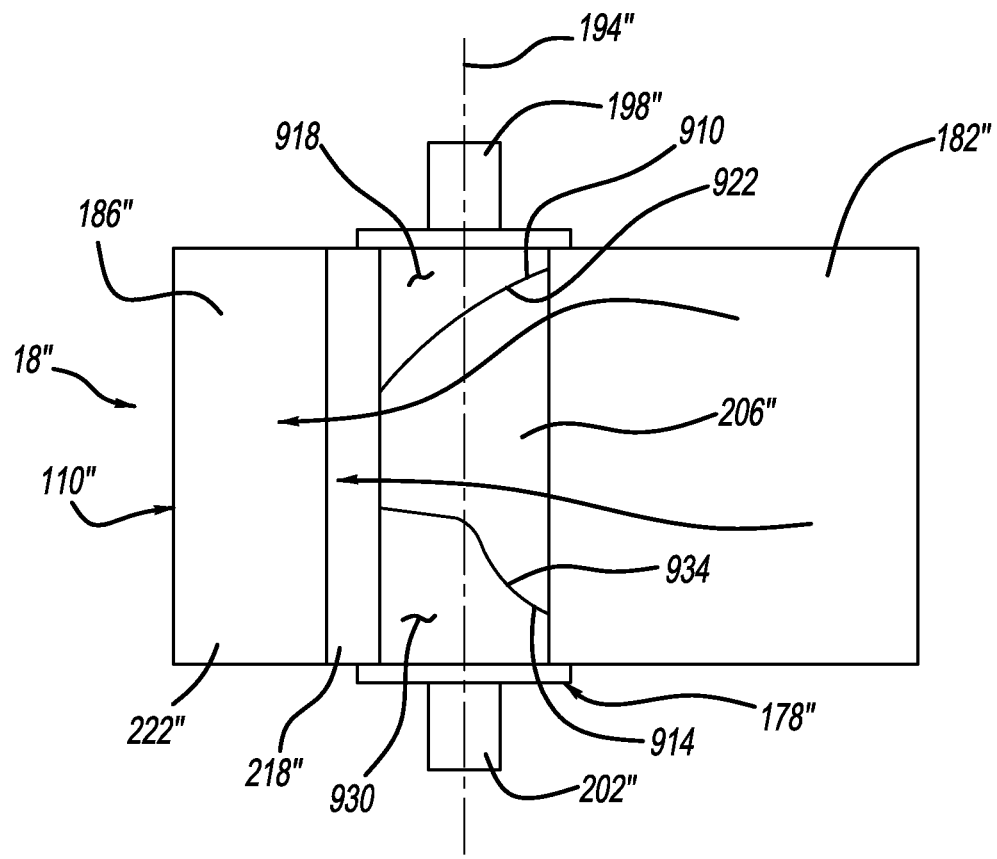
FIG. 9 is a side elevated view of a portion of a flue door mechanism for an HVAC system of a third construction and in accordance with the present disclosure.

With reference to FIG. 9, a portion of an HVAC system of a third construction is illustrated and generally denoted by reference numeral 18". The HVAC system 18" can be substantially similar to the HVAC systems 18 and double primed numerals denote similar components to non-primed numerals of HVAC system 18. Accordingly, only the differences will be described in detail, and the descriptions of the similar components of FIGS. 1-5 are incorporated by reference with respect to the similarly numbered components. A portion of the flue door mechanism 110" of the third construction is illustrated as having first and second doors 182", 186" that can be similar to the first and second doors 182, 186. In this construction, the throttle member 190 can instead be replaced by one or more vanes. In the example provided, the central body 206" includes a first vane 910 and a second vane 914, though other numbers and configurations can be used.

The vanes 910, 914 can extend radially outward from the central body 206" similar to the throttle member 190, but can also wrap around the central body 206" in a circumferential and axial direction. In the example provided, the first vane 910 has a first blocking surface 918 and a first directing surface 922. The directing surface can be generally helically shaped, though other configurations can be used, to direct airflow from the air supply flue 126" to a specific location in the portion 170" of the hot air flue 130". Similarly, the second vane 914 can have a second blocking surface 930 and a second directing surface 934. The shape of the second directing surface 934 can direct airflow to a specific location in the portion 170" of the hot air flue 130". The shapes of the vanes 910, 914 can vary along their lengths. The blocking surfaces 918, 930 can generally oppose or slide on a surface 614" of the support wall 154" that can be similar to the surface 614' shown in FIGS. 7 and 8 to selectively block flow between the blocking surfaces 918, 930 and the surface 614' of the support wall 154". The shapes of the vanes 910, 914 can determine the amount and location of the airflow through the bypass flue 142". Since the cross-sectional area between the vanes 910, 914 that aligns with the surface 614" of the support wall 154" varies with rotational position of the pivot member 178", the amount and location of fluid communication through the bypass flue 142" can be controlled by the rotational position of the pivot member 178".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle heating, ventilation, and air conditioning ("HVAC") assembly comprising:
   a mixing flue;
   a first flue configured to fluidly couple a first heat exchanger to the mixing flue;
   a second flue configured to fluidly couple a second heat exchanger to the mixing flue;
   a first door configured to move between a first, a second, and a third position, the first door inhibiting fluid communication through the second flue when the first door is in the first position, the first door inhibiting fluid communication through the first flue when the first door is in the second position, the first door permitting fluid communication through the first and second flues when the first door is in the third position;
   a second door, the second door configured to inhibit fluid communication between the second flue and the mixing flue when the first door is in the first position, and to permit fluid communication between the second flue and the mixing flue when the first door is in the second and third positions;
   a third flue configured to fluidly couple the first heat exchanger to a portion of the second flue downstream of the second heat exchanger and upstream of the mixing flue when the first door is in the third position;
   a throttle member, the first door configured to move to a fourth position wherein the first door permits fluid communication through the first and second flues, the throttle member inhibiting fluid communication through the third flue when the first door is in the fourth position and permitting fluid communication through the third flue when the first door is in the third position; and
   a pivot member configured to pivot about an axis, the first door being coupled to the pivot member for common rotation with the pivot member, the first door being rotatable between the first, second, third, and fourth positions, and the throttle member being coupled to the pivot member for common rotation with the pivot member;
   wherein the throttle member extends axially along the pivot member a length less than an axial width of the third flue.

2. The HVAC assembly of claim 1, wherein the second door extends into the second flue in an upstream direction when the first door is in the third position to direct air from the third flue in an upstream direction relative to the second flue.

3. The HVAC assembly of claim 2, wherein the first and second doors are coupled for common rotation about an axis.

* * * * *